United States Patent
Rechtman et al.

(10) Patent No.: US 12,500,830 B2
(45) Date of Patent: Dec. 16, 2025

(54) LINK TRAINING

(71) Applicant: MELLANOX TECHNOLOGIES, LTD., Yokneam (IL)

(72) Inventors: Zvi Rechtman, Petah Tikva (IL); Guy Lederman, Ness Ziona (IL); Stanislav Gurtovoy, Nesher (IL); Ran Ravid, Tel Aviv (IL); Lavi Koch, Tel Aviv (IL); Oded Nadir, Ramat HaShofet (IL)

(73) Assignee: Mellanox Technologies, Ltd, Yokneam (IL)

( * ) Notice: Subject to any disclaimer, the term of this patent is extended or adjusted under 35 U.S.C. 154(b) by 461 days.

(21) Appl. No.: 18/174,701

(22) Filed: Feb. 27, 2023

(65) Prior Publication Data
US 2024/0056380 A1 Feb. 15, 2024

Related U.S. Application Data

(60) Provisional application No. 63/397,856, filed on Aug. 14, 2022.

(51) Int. Cl.
*H04L 12/66* (2006.01)
*H04L 45/00* (2022.01)
*H04L 45/02* (2022.01)

(52) U.S. Cl.
CPC .............. *H04L 45/02* (2013.01); *H04L 45/20* (2013.01)

(58) Field of Classification Search
CPC .............. H04L 1/0041; H04L 1/0045; H04L 25/03343; H04L 25/03019; H04L 25/03885; H04L 25/0272; H04L 2025/0377; H04L 1/203; H04L 1/02; H04L 27/01; H04L 25/028; H04L 2025/03815; H04B 10/40; H04B 10/60; H04B 10/50
See application file for complete search history.

(56) References Cited

U.S. PATENT DOCUMENTS

| | | | |
|---|---|---|---|
| 9,106,387 B2 | 8/2015 | Goldenberg et al. | |
| 10,412,673 B2 | 9/2019 | Levy et al. | |
| 11,190,191 B2 | 11/2021 | Wolkovitz et al. | |
| 11,424,968 B1 * | 8/2022 | Sun | H04L 25/4908 |

(Continued)

OTHER PUBLICATIONS

Meltser et al., U.S. Appl. No. 17/994,326, filed Nov. 27, 2022.

(Continued)

*Primary Examiner* — Kharye Pope
(74) *Attorney, Agent, or Firm* — Meitar Patents Ltd.; Daniel Kligler

(57) ABSTRACT

In one embodiment, a multi-segment communication network system includes nodes connected via links, a first node including a first receiver and transmitter, and a second node including a second receiver and transmitter, wherein the first transmitter is to transmit a link training frame including a training pattern to the second receiver, which is to receive the link training frame, the second node is to find a tuning factor to which to tune the first transmitter responsively to the training pattern, and generate a request indicative of the found tuning factor, the second transmitter is to send the request in the link training frame via a plurality of the links to the first receiver, the first receiver is to receive the request, and the first node is to tune at least one parameter of the first transmitter based on the tuning factor indicated in the request.

30 Claims, 17 Drawing Sheets

(56) References Cited

U.S. PATENT DOCUMENTS

| | | | | |
|---|---|---|---|---|
| 2014/0241411 | A1* | 8/2014 | Ghiasi | H04L 25/4904 |
| | | | | 375/231 |
| 2017/0017604 | A1* | 1/2017 | Chen | G06F 11/3027 |
| 2017/0185502 | A1* | 6/2017 | Iyer | G06F 11/221 |
| 2018/0181502 | A1* | 6/2018 | Jen | G06F 13/4022 |
| 2018/0227149 | A1* | 8/2018 | Johnson | H04L 49/90 |
| 2018/0331864 | A1* | 11/2018 | Das Sharma | H04L 25/03 |
| 2019/0104057 | A1* | 4/2019 | Goel | H04L 47/122 |
| 2019/0386851 | A1* | 12/2019 | Dai | H04L 49/3054 |
| 2022/0350713 | A1 | 11/2022 | Mula et al. | |
| 2023/0050128 | A1* | 2/2023 | Razavi Majomard | |
| | | | | H04L 25/03006 |

OTHER PUBLICATIONS

Infiniband Trade Association, "InfiniBandTM Architecture Specification", vol. 1, Release 1.3, pp. 1-1842, Mar. 3, 2015.

"IEEE Standard for Ethernet: Amendment 3: Media Access Control Parameters for 50 GB/s and Physical Layers and Management Parameters for 50 GB/s, 100 GB/s, and 200 GB/s Operation", IEEE Std 802.3cd™-2018, pp. 1-40, Dec. 5, 2018.

* cited by examiner

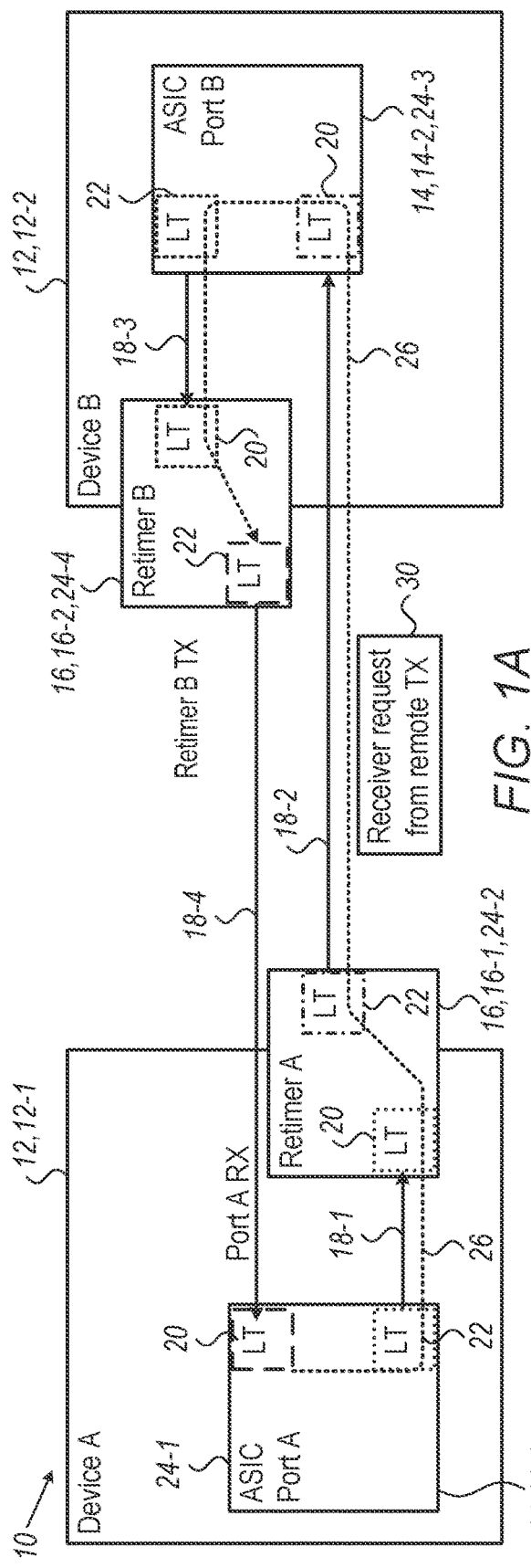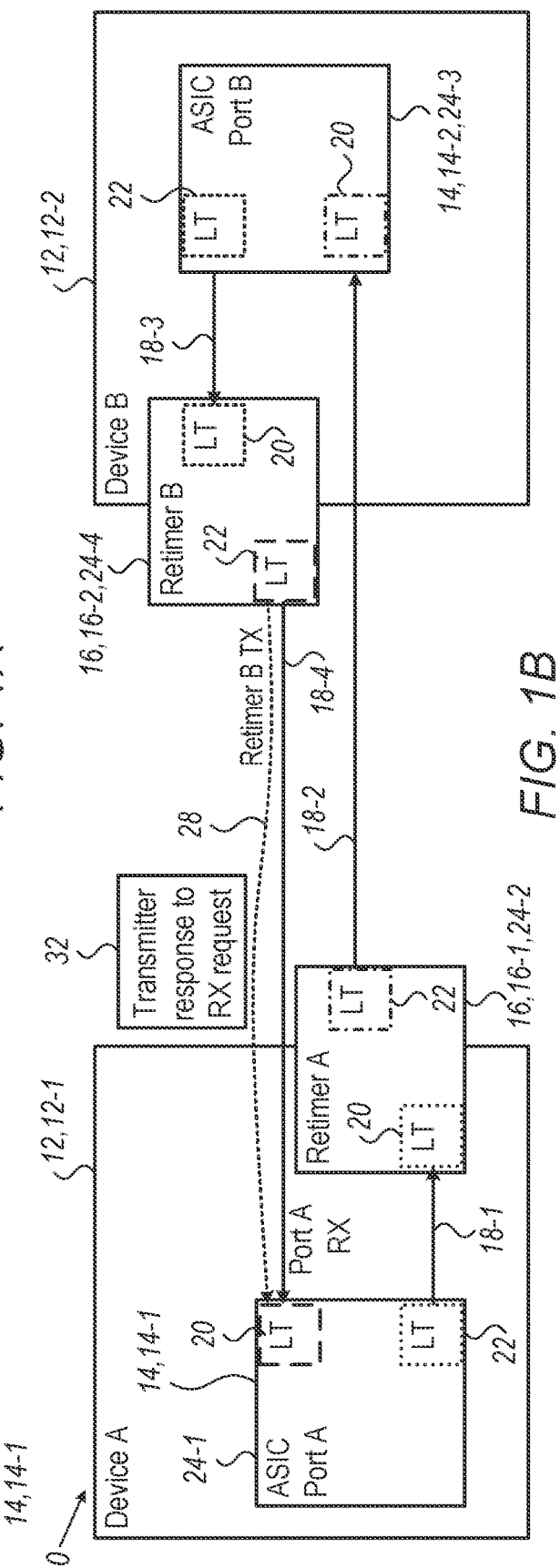

LINK TRAINING

RELATED APPLICATION INFORMATION

The present application claims benefit of U.S. Provisional Patent Application Ser. 63/397,856 of Rechtman, et al., filed Aug. 14, 2022, the disclosure of which is hereby incorporated herein by reference.

FIELD OF THE INVENTION

The present invention relates to computer networks, and in particular, but not exclusively to, link training.

BACKGROUND

Currently network link-training (LT) is performed over passive single segment connected devices to perform adaptive equalization of the receiver and transmitter for a specific channel and receiver/transmitter design. One basic requirement to perform link-training is symmetrical bi-directional connectivity.

SUMMARY

There is provided in accordance with an embodiment of the present disclosure, a multi-segment communication network system, including multiple nodes connected via links, each node including a transmitter and receiver, the nodes including a first node, which includes a first receiver and a first transmitter, and a second node, which includes a second receiver and a second transmitter, wherein the first transmitter is to transmit a link training frame including a training pattern to the second receiver, the second receiver is to receive the link training frame from the first transmitter, the second node is to find a tuning factor to which to tune the first transmitter responsively to the training pattern, and generate a request indicative of the found tuning factor, the second transmitter is to send the request in the link training frame via a plurality of the links to the first receiver, the first receiver is to receive the request, and the first node is to tune at least one parameter of the first transmitter based on the tuning factor indicated in the request.

Further in accordance with an embodiment of the present disclosure the second receiver is a link partner of the first transmitter.

Still further in accordance with an embodiment of the present disclosure the first node is to recognize that the request is designated to be fulfilled by the first node.

Additionally in accordance with an embodiment of the present disclosure the first node is to tune the at least one parameter of the first transmitter based on the tuning factor indicated in the request responsively to the request being recognized as designated to be fulfilled by the first node.

Moreover, in accordance with an embodiment of the present disclosure the request has an associated destination indicator, the first node being to recognize that the request is designated to be fulfilled by the first node responsively to the destination indicator associated with the request.

Further in accordance with an embodiment of the present disclosure the destination indicator includes a hop indicator indicating a number of the links from the second node to the first node.

Still further in accordance with an embodiment of the present disclosure each of the nodes disposed between the links extending from the second transmitter to the first transmitter is to adjust the hop indicator, and when the request arrives at the first node, the first node is to recognize that the request is designated to be fulfilled by the first node from a value of the hop indicator.

Additionally in accordance with an embodiment of the present disclosure the link training frame includes multiple requests having corresponding destination indicators.

Moreover, in accordance with an embodiment of the present disclosure the destination indicators include respective hop indicators indicating a number of the links over which the corresponding requests should traverse prior to being processed by respective ones of the nodes.

Further in accordance with an embodiment of the present disclosure the second node is to adjust at least one of the hop indicators.

Still further in accordance with an embodiment of the present disclosure the second node is to tune at least one parameter of the second transmitter responsively to a given tuning factor in a given request of the multiple requests in the link training frame.

Additionally in accordance with an embodiment of the present disclosure the second node is to recognize that the given request is designated to be fulfilled by the second node from a corresponding one of the destination indicators.

Moreover, in accordance with an embodiment of the present disclosure the second transmitter is to send the request with another training pattern in the link training frame via a link to a third receiver of a third one of the nodes.

Further in accordance with an embodiment of the present disclosure the links define receiver-transmitter link partners, the nodes are to indicate to other ones of the nodes that link training of respective ones of the receiver-transmitter link partners has been completed over respective ones of the links, and the nodes are to exit link training mode and enter operational mode responsively to all the receiver-transmitter link partners being indicated as having completed link training.

Still further in accordance with an embodiment of the present disclosure the link training frame includes multiple requests, the links define receiver-transmitter link partners, respective ones of the nodes are to indicate to the second node using the multiple requests that link training of respective ones of the receiver-transmitter link partners has been completed over respective ones of the links, and the second node is to exit link training mode and enter operational mode responsively to all the receiver-transmitter link partners having completed link training as partially indicated in the multiple requests of the link training frame.

There is also provided in accordance with another embodiment of the present disclosure, a multi-segment communication network method, including transmitting by a first transmitter of a first node a link training frame including a training pattern to a second receiver of a second node, receiving by the second receiver the link training frame from the first transmitter, finding by the second node a tuning factor to which to tune the first transmitter responsively to the training pattern, generating by the second node a request indicative of the found tuning factor, sending by a second transmitter of the second node the request in the link training frame via a plurality of links to a first receiver of the first node, receiving the request by the first receiver, and tuning by the first node at least one parameter of the first transmitter based on the tuning factor indicated in the request.

Additionally in accordance with an embodiment of the present disclosure the second receiver is a link partner of the first transmitter.

Moreover, in accordance with an embodiment of the present disclosure, the method includes recognizing by the first node that the request is designated to be fulfilled by the first node.

Further in accordance with an embodiment of the present disclosure the tuning includes tuning the at least one parameter of the first transmitter based on the tuning factor indicated in the request responsively to the request being recognized as designated to be fulfilled by the first node.

Still further in accordance with an embodiment of the present disclosure the request has an associated destination indicator, the recognizing including recognizing that the request is designated to be fulfilled by the first node responsively to the destination indicator associated with the request.

Additionally in accordance with an embodiment of the present disclosure the destination indicator includes a hop indicator indicating a number of links from the second node to the first node.

Moreover, in accordance with an embodiment of the present disclosure, the method includes each of the nodes disposed between the links extending from the second transmitter to the first transmitter adjusting the hop indicator, and wherein the recognizing includes, when the request arrives at the first node, recognizing that the request is designated to be fulfilled by the first node from a value of the hop indicator.

Further in accordance with an embodiment of the present disclosure the link training frame includes multiple requests having corresponding destination indicators.

Still further in accordance with an embodiment of the present disclosure the destination indicators include respective hop indicators indicating a number of the links over which the corresponding requests should traverse prior to being processed by respective ones of the nodes.

Additionally in accordance with an embodiment of the present disclosure, the method includes the second node adjusting at least one of the hop indicators.

Moreover, in accordance with an embodiment of the present disclosure, the method includes the second node tuning at least one parameter of the second transmitter responsively to a given tuning factor in a given request of the multiple requests in the link training frame.

Further in accordance with an embodiment of the present disclosure, the method includes the second node recognizing that the given request is designated to be fulfilled by the second node from a corresponding one of the destination indicators.

Still further in accordance with an embodiment of the present disclosure the sending includes the second transmitter sending the request with another training pattern in the link training frame via a link to a third receiver of a third node.

Additionally in accordance with an embodiment of the present disclosure multiple nodes connected via links include the first and second node, the links defining receiver-transmitter link partners, the method further including given nodes of multiple nodes indicating to other ones of the multiple nodes that link training of respective ones of the receiver-transmitter link partners has been completed over respective ones of the links, and the nodes exiting link training mode and entering operational mode responsively to all the receiver-transmitter link partners being indicated as having completed link training.

Moreover, in accordance with an embodiment of the present disclosure the link training frame includes multiple requests, multiple nodes being connected via links including the first and second node, the links defining receiver-transmitter link partners, the method further including respective ones of the nodes indicating to the second node using the multiple requests that link training of respective ones of the receiver-transmitter link partners has been completed over respective ones of the links, and the second node exiting link training mode and entering operational mode responsively to all the receiver-transmitter link partners having completed link training as partially indicated in the multiple requests of the link training frame.

BRIEF DESCRIPTION OF THE DRAWINGS

The present invention will be understood from the following detailed description, taken in conjunction with the drawings in which:

FIGS. 1A and 1B are block diagram views of a multi-segment communication network system constructed and operative in accordance with an embodiment of the present invention;

DESCRIPTION OF EXAMPLE EMBODIMENTS

Overview

Figure 2:
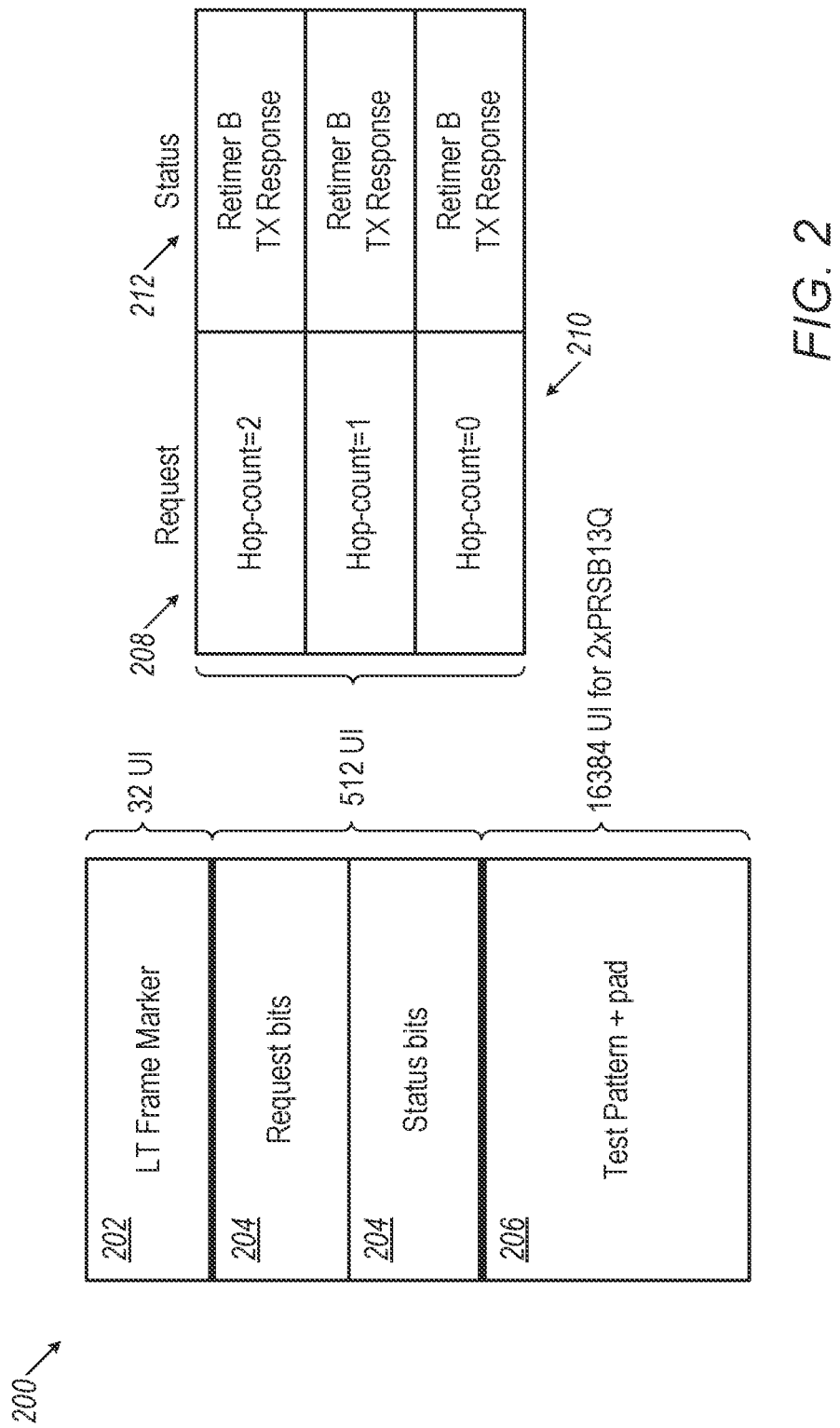
FIG. 2 is a view of an LT frame for use in the system of FIG. 1A.

With the increase of Networking interface rate, the Signal integrity (ST) margins of Port and physical layer unit (PHYs) are decreasing which results in higher error rate (BER). In order to obtain more SI performance, complex adaptive equalization (EQ) schemes are performed to optimize both the receiver and transmitter. Standards like 802.3 and InfiniBand (IB) define a back-channel link training protocol as the infrastructure to perform the adaptive equalization. For 802.3, the link training protocol is defined as "Physical Media Dependent (PMD) control function", while for IB it is part of the Link Initialization finite state machine (FSM).

Therefore, the back-channel link training protocol was defined and limited to a passive single-segment channel (between two physical media dependent (PMD) devices). It may be assumed that the PMDs are bi-directional and symmetrical and the two PMDs are synchronized upon completion of LT by the LT protocol and State Machine. By way of example, consider two nodes A and B having bi-directional symmetrical connectivity between two ports, when Port A's transmitter (TX) is directly connected to Port B's receiver (RX) and Port B's TX is directly connected to Port A's RX. This direct connectivity is mandatory as part of some existing LT standards and solutions.

The 802.3 Link training protocol defines a Link Training (LT) Frame, which has a fixed length structure, constructed from a low frequency frame marker, low frequency control/ request and status/response (DME coded) bits for protocol handshake/backchannel and a high-speed training pattern to allow the tuning process. During LT both link partners exchange LT frames simultaneously. Each LT frame may include a receiver request from the peer's transmitter (e.g., to increase or decrease signal amplitude) and the local transmitter response/status to each request. The protocol handshake is defined in such a way that for any new RX request, the receiver must wait to get a response from the remote transmitter before the receiver can initiate a new request. Therefore, currently in order to perform LT there is an inherent requirement to have a bi-directional handshake between two nodes with single segment bi-directional symmetrical connectivity.

However, some systems do not comply with the single segment bi-directional symmetrical connectivity model and therefore the back-channel link training protocol may not be applied in those systems. For example, two nodes A and B may have half-retimed connectivity whereby there is a retimer B between the TX of node B and the RX of node A, as well as a retimer A between the TX of node A and the RX of node B. In such a case, node A's RX is lacking direct access to Retimer B's TX and therefore link training over the link between node A and retimer B cannot be performed using the back-channel link training protocol. The above assumptions (about the PMDs) cannot be met in multi-segment and half-retimed channels. Therefore, the multi-segment and half-retimed channels use cases lack an LT solution, which results in non-optimized SI performance for such cases (e.g., higher BER).

Nevertheless, multi-segment systems are expected to achieve the desired SI performance and/or BER target without any backchanneling process, which means they are limited to perform a receiver adaptive equalization process and lack the ability to an perform adaptive equalization process on the TX. Also, high bandwidth links are expected to be limited by SI performance, therefore achieving higher margins on SI performance, over optical, retimed, and half-retimed channels is critical to meet application requirements like frame loss ratio (FLR).

Another problem multi-segment links introduce is how to synchronize all segments of the link, so that there will not be race conditions between the completion of LT for each segment. Since 802.3 and InfiniBand LT are addressing each segment as a single segment such synchronization does not exist.

Embodiments of the present invention allow link-training to be performed for multi-segment connected devices over passive and optical media and for example allow link-training over non-symmetrical non-bidirectional connectivity as well. For example, link training may be performed for half-retimed optical transceiver solutions, which reduces power, area, cost and latency penalty of the optical transceiver and system. Embodiments of the present invention provide a method to synchronize all segments on the channel about the LT state and define a solution for non-bi-directional and symmetrical use.

In some embodiments, a receiver (RX) receives a test pattern from its link partner transmitter (TX), and identifies tuning factors to tune the link partner TX based on reception of the test pattern. Link partners are nodes directly connected (in a direction from TX of link partner A to the RX of the link partner B) via a link without any active devices (e.g., retimer or optical engines) therebetween in that link between the two nodes. However, as the RX of link partner B may have no way to send a message (including tuning factors) directly to the TX of link partner A, the tuning factors are sent in a request in an LT request frame via many hops (e.g., around the links via one or more nodes such as one or more retimers and one or more ports) to the TX of link partner A. The LT request frame has a low frequency part including requests and a high frequency part including training data (e.g., test pattern). Once the request from the RX of link partner B is received by the link partner A TX, the tuning factors are used by the node of the link partner A TX to tune the transmission parameters of that TX. This may be an iterative process. The same happens for all the TX and RX link partner pairs in the system. The destination TX for the request including the tuning factors is determined using a hop count. The hop count may be set to equal the number of hops to the relevant TX and at every hop the hop_count is reduced by 1, for example. Once the hop count is equal to 0 (or other suitable value), the receiving node knows that that request is for the TX of that node and retrieves the tuning factor(s) from the LT request frame and applies the tuning factor(s). If the hop count is not equal to 0, the request is passed on to the next node etc. In other embodiments, another method may be used to identify the destination of the request instead of hop count. In other embodiments, hop count could increase after each hop.

Once an LT RX is equalized (e.g., the transmission parameters of its link partner TX are tuned correctly), the status of that RX is changed to "ready allowed" in the LT request frame to notify other receivers of the status. Each receiver remains in LT mode until it receives a signal from all the other nodes that they have also completed LT by setting their status to "ready allowed" in the LT request frame and the local receiver is also ready. This is done by means of the LT request frame which includes the LT completion status of each of the RXs. The LT request frame is also known as LT frame in the description below.

System Description

Reference is now made to FIGS. 1A and 1B, which are block diagram views of a multi-segment communication network system 10 constructed and operative in accordance with an embodiment of the present invention.

The system 10 includes two devices 12, device A and device B. Each device 12 includes a port 14 and a retimer 16. Each port 14 and retimer 16 includes a receiver 20 and a transmitter 22.

For the sake of simplicity each port 14 and retimer 16 may be defined as a node 24 in the system 10. Therefore, the system 10 includes multiple nodes 24 connected via links 18. A port 14-1 (Port A) of a device 12-1 (Device A) is defined as node 24-1. A retimer 16-1 (Retimer A) of device 12-1 is defined as node 24-2. A port 14-2 (Port B) of a device 12-2 (Device B) is defined as node 24-3. A retimer 16-2 (Retimer B) of device 12-2 is defined as node 24-4. The system 10 may include any suitable number of nodes 24. The nodes may include one or more retimers and/or one or more ports and/or one or more optical engines and/or one or more optical connectors connected via links 18 in a suitable topology.

The nodes 24 are connected by links 18 as follows. The transmitter 22 of node 24-1 is connected to the receiver 20 of node 24-2 by a link 18-1. The transmitter 22 of node 24-2 is connected to the receiver 20 of node 24-3 by a link 18-2. The transmitter 22 of node 24-3 is connected to the receiver 20 of node 24-4 by a link 18-3. The transmitter 22 of node 24-4 is connected to the receiver 20 of node 24-1 by a link 18-4. The links 18 therefore define receiver-transmitter link partners at either side of each link 18.

To overcome the fact that there is no direct access from a receiver (e.g., the receiver 20 of node 24-1) to a link partner transmitter (e.g., the transmitter 22 of node 24-4), "request control forwarding" is used. FIGS. 1A and 1B demonstrate the forwarding process for Port A's receiver request 30 (FIG. 1A) along dotted line 26 (from node 24-1 to node 24-4), and a response 32 of Retimer B's transmitter 22 (FIG. 1B) along dotted line 28 (from node 24-4 to node 24-1) to Port A's RX 20. All the receivers 20 and transmitters 22 of all the nodes 24 perform a similar handshake. FIG. 1A shows port A's RX generating the request 30 that is forwarded to Retimer B's TX. FIG. 1B shows retimer B's TX generating the status/response 32 directly to the connected Port A's RX.

Reference is now made to FIG. 2, which is a view of an LT frame 200 for use in the system 10 of FIG. 1A. The LT frame 200 includes a low frequency frame marker 202, low frequency control/request and status/response (DME coded) bits 204 for protocol handshake and for conveying requests, hop_counts of the requests (described in more detail below), LT status, and a high-speed training pattern 206 to allow the tuning process described in more detail below.

The control/request and status/response bits 204 may include one or more requests 208 from one or more nodes 24 or receivers 20 and associated hop_count(s) 210 and a status field 212 associated with each request 208. FIG. 2 shows the number of bits in the LT frame 200 for the different sections. For example, 512 UI (each unit interval (UI) is equal to 2 bits in the case of PAM4) for the control/request and status/response bits 204. The LT frame 200 sections may include any suitable number of bits and are not limited by the examples shown in FIG. 2. For example, the control/request and status/response bits 204 may include 256 UI.

Each LT frame may include one or more receiver requests (e.g., to increase or decrease signal amplitude) and transmitter response/status to at least one of the requests. In order to avoid complex discovery/ID allocation protocols, "Hop count" may be used. However, other methods may be used. The hop_count is a variable/field that is added to the LT request 208 control bits. In some embodiments, bits 14 and 15 are used for the hop_count since they are not specified for use by the 802.3.

Assuming a single request per LT frame 200, when one of the receivers 20 receives a new LT request frame, the receiver 20 checks the "Hop count" field to determine if the destination of the request is for the local TX (i.e., its own TX), or if the LT frame 200 should be forwarded to the next node 24. Before the receiver forwards the LT frame 200, the receiver decrements the hop count field in the LT frame 200.

The LT frame 200 may include several requests with several forwarding hops counts, while the status field supports direct status response. Therefore, the status bits generally do not include the hop count field and are generally not forwarded to another receiver. In other words, the status bits are used to acknowledge the neighboring hop (i.e., directly connected link partner receiver) regarding the status of the transmitter, for example: FIR TX updates, modulation, and precoding configuration status.

In disclosed embodiments, there are up to three Hop_count requests that may be transmitted and received over each link 18. Three Hop_count requests are sufficient for the disclosed topology of FIG. 1A. It should be noted that other embodiments may include more or less than three Hop_count requests. Two out of the three received requests received by one of the receivers 20 are generally forwarded to the transmitter 22 of that node 24 (after decrementing the Hop_count) for forwarding to the next node 24, and the remaining received request is processed by the local node 24 as a local TX update request. The transmitter 22 of the local node 24 transmits three ongoing requests, two of which were forwarded from the received path, and the third one is generated locally by the local node 24 and includes a request to the remote TX link partner of the local node 24.

The TX of the local node 24 may perform a round-robin arbitration (or any other suitable arbitration method) between the 3 possible requests on the transmitter. Round robin arbitration is a scheduling scheme which gives to each requestor its share in use of a common resource for a limited time or data element in cyclic matter. In the above example, three requests use the LT frame 200 (i.e., a common resource) as a carrier with each request using a single LT frame at a time (limited time/data element) in a cyclic matter.

Figure 3:
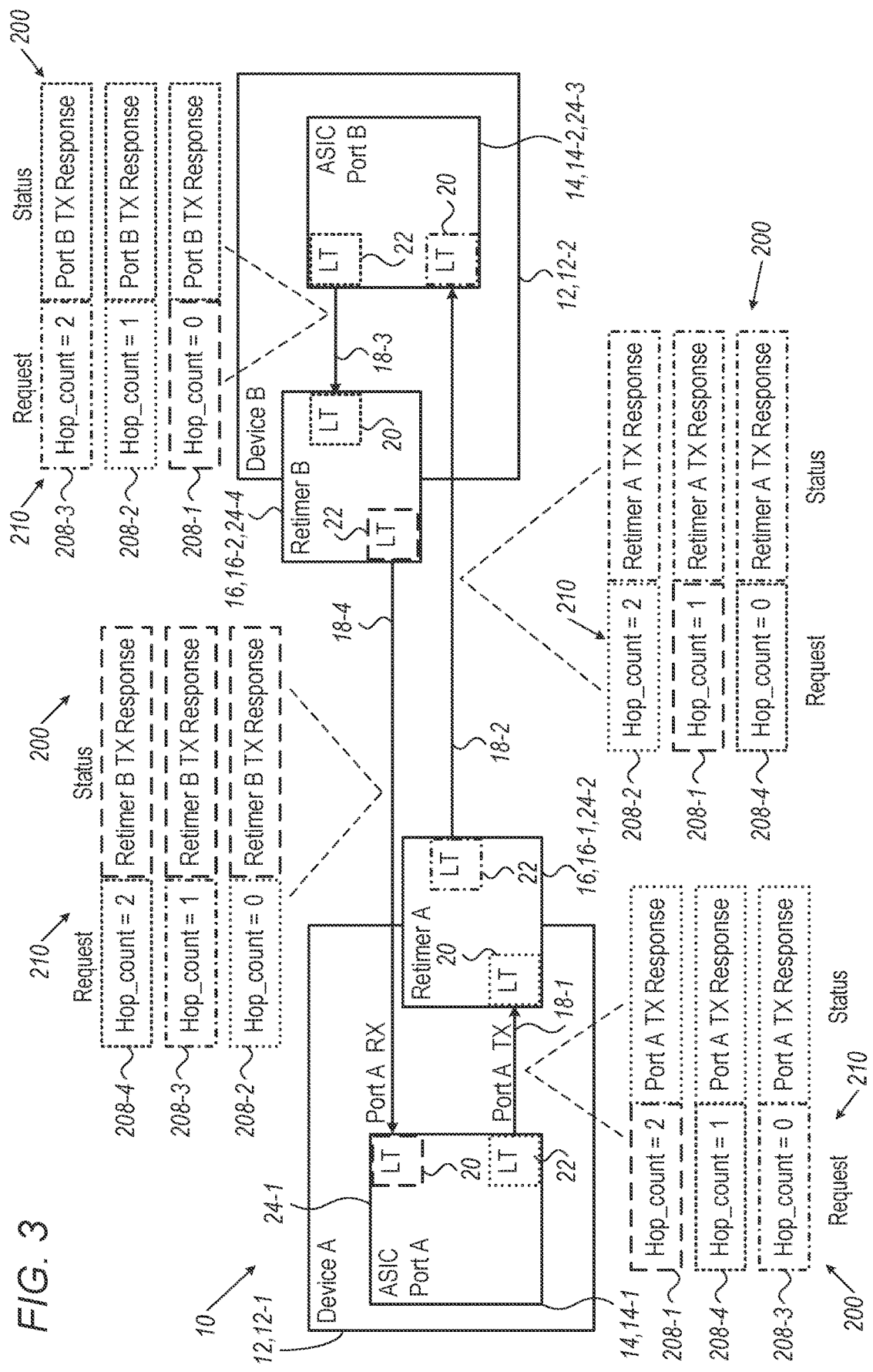
FIG. 3 is a block diagram view of the system of FIG. 1A illustrating request forwarding.

Reference is now made to FIG. 3, which is a block diagram view of the system 10 of FIG. 1A illustrating request forwarding over three-hops. Each request 208 (which is identified with a different border type as shown in the Figures in the LT frame 200) is forwarded over 3 links 18. FIG. 3 shows four requests 208 including request 208-1, request 208-2, request 208-3, request 208-4 generated by node 24-1, node 24-2, node 24-3, node 24-4, respectively. For example, request 208-1 of Port A's (node 24-1) receiver 20 is sent to Retimer A's (node 24-2) receiver 20 with hop_count=2. Retimers A's TX 22 sends port A's request 208-1 with hop_count=1 to Port B's (node 24-3) RX 20, and Port B's TX 22 sends port A's request 208-1 with hop_count=0 to Retimer B's (node 24-4) RX 20. Then Retimer B identifies that the request 208-1 is directed to its own TX 22, and accepts the request 208-1 and acts according to the content of the request bits, and generates a new status update as an acknowledgement to the initiator (i.e., port A's RX 20).

Transmitter 22 of node 24-4 is configured to transmit a link training frame 200 comprising a training pattern 206 (and the multiple requests 208-2, 208-3, 208-4 having corresponding destination indicators 210) to receiver 20 of node 24-1. Receiver 20 of node 24-1 is a link partner of transmitter 22 of node 24-4. In some embodiments, the destination indicators 210 include respective hop indicators 210 indicating a number of the links 18 over which the corresponding requests 208 should traverse prior to being processed by respective ones of the nodes 24. In some embodiments, multiple requests 208 are included in a single LT frame 200. In other embodiments, each request 208 is included in a different LT frame 200.

Receiver 20 of node 24-1 is configured to receive the link training frame 200 from transmitter 22 of node 24-4. Node 24-1 is configured to recognize that a given request of the requests 208-2 (from node 24-2) in the link training frame 200 is designated to be fulfilled by node 24-1 from a corresponding one of the destination (e.g., hop) indicators 210. Node 24-1 is configured to tune at least one parameter of transmitter 22 of node 24-1 responsively to a given tuning factor in the given request 208-2.

Node 24-1 is configured to adjust at least one of the hop indicators 210 of the requests 208 in the link training frame 200. For example, node 24-1 is configured to adjust the hop indicators 210 of requests 208-3 and 208-4 from 1 and 2 down to 0 and 1, respectively.

Node 24-1 is configured to: find a tuning factor to which to tune transmitter 22 of node 24-4 responsively to the training pattern 206 (included in the LT frame 200 received by node 24-1 from node 24-4); and generate a new request 208-1 indicative of the found tuning factor. The request 208-1 has an associated destination indicator 210. In some embodiments, the destination indicator 210 of the request 208-1 includes a hop indicator (e.g., hop_count=2) indicating a number of the links 18 from node 24-1 to node 24-4.

Transmitter 22 of node 24-1 is configured to send the request 208-1 in the link training frame 200 via a plurality of the links 18 to the receiver 20 of node 24-4. In detail, the transmitter 22 of node 24-1 is configured to send the request 208-1 (with the other requests 208-3, 208-4) with a new training pattern 206 in the link training frame 200 via link 18-1 to the receiver 20 of node 24-2. The request 208-1 is then sent by node 24-2 to node 24-3, and by node 24-3 in the link training frame 200 to the receiver 20 of node 24-4 while the new training pattern 206 in used by node 24-2. Each node 24 disposed between the links 18 extending from transmitter 22 of node 24-1 to transmitter 22 of node 24-4 is configured to adjust the hop indicators 210 of the request 208 in the link training frame 200.

The receiver 20 of node 24-4 is configured to receive the request 208-1 in the link training frame 200. Node 24-4 is configured to recognize that the request 208-1 is designated to be fulfilled by node 24-4 (responsively to the destination indicator 210 associated with the request 208-1). In some embodiments (when the hop indicator is used), when the request arrives at node 24-4, node 24-4 is configured to recognize that the request 208-1 is designated to be fulfilled by node 24-4 from a value of the hop indicator (e.g., hop_count=0).

Node 24-4 is configured to tune at least one parameter of transmitter 22 of node 24-4 based on the tuning factor indicated in the request 208-1 (responsively to the request 208-1 being recognized as designated to be fulfilled by node 24-4).

Reference is now made to FIGS. 4A-D, which are block diagram views of the system 10 of FIG. 1A illustrating the flow of the request forwarding of FIG. 3.

Figure 4A:
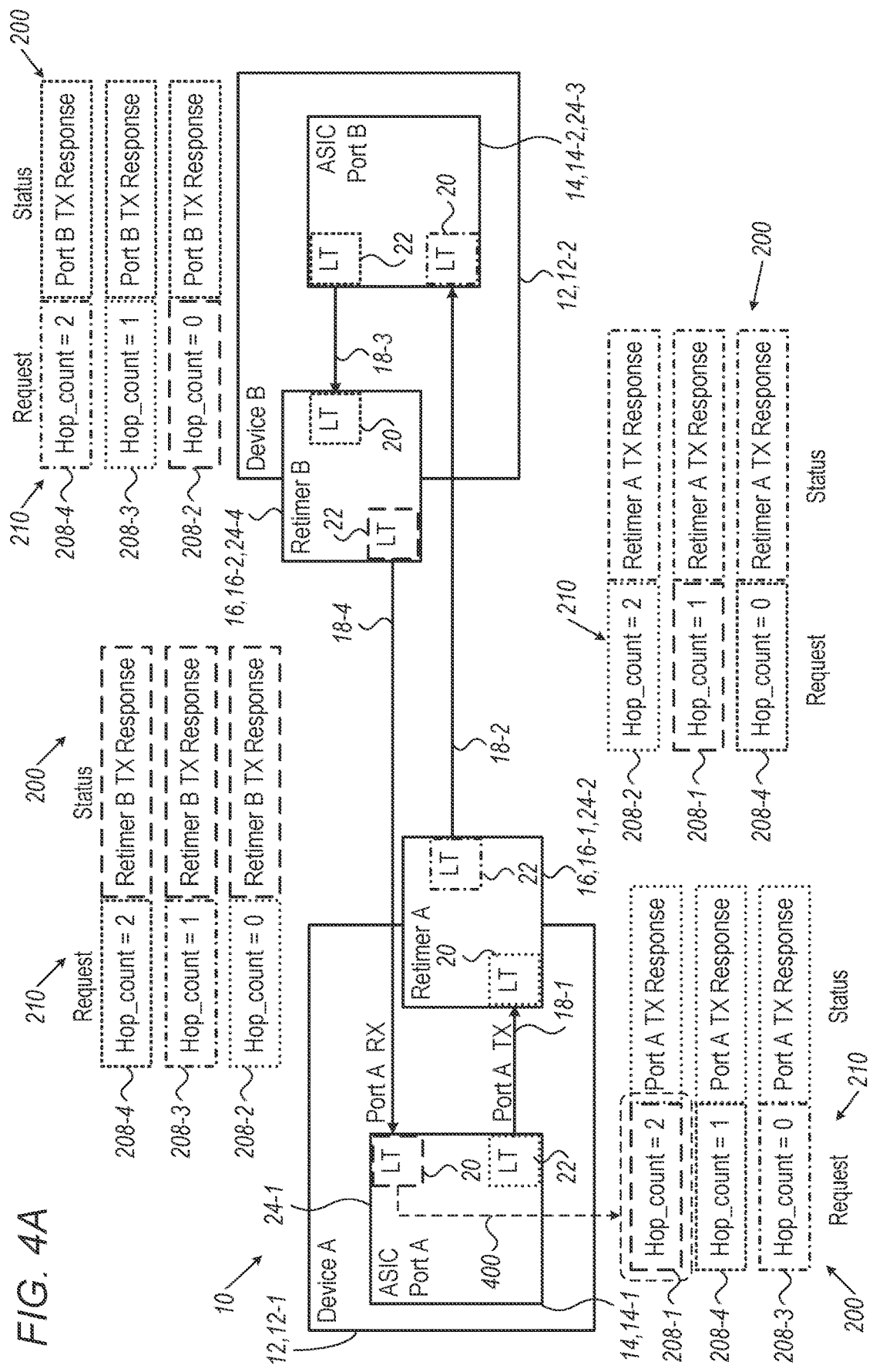
FIGS. 4A-D are block diagram views of the system of FIG. 1A illustrating the flow of the request forwarding of FIG. 3.

FIG. 4A shows Port A's (node 24-1) RX 20 generating request 208-1 which is sent (line 400) from Port A's TX 22 to Retimer A's (node 24-2) RX 20 with hop_count=2. FIG. 4A also shows retimer A's (node 24-2) RX receiving the request 208-1 with hop_count=2. Therefore, the destination of the received request 208-1 is not node 24-2.

Figure 4B:
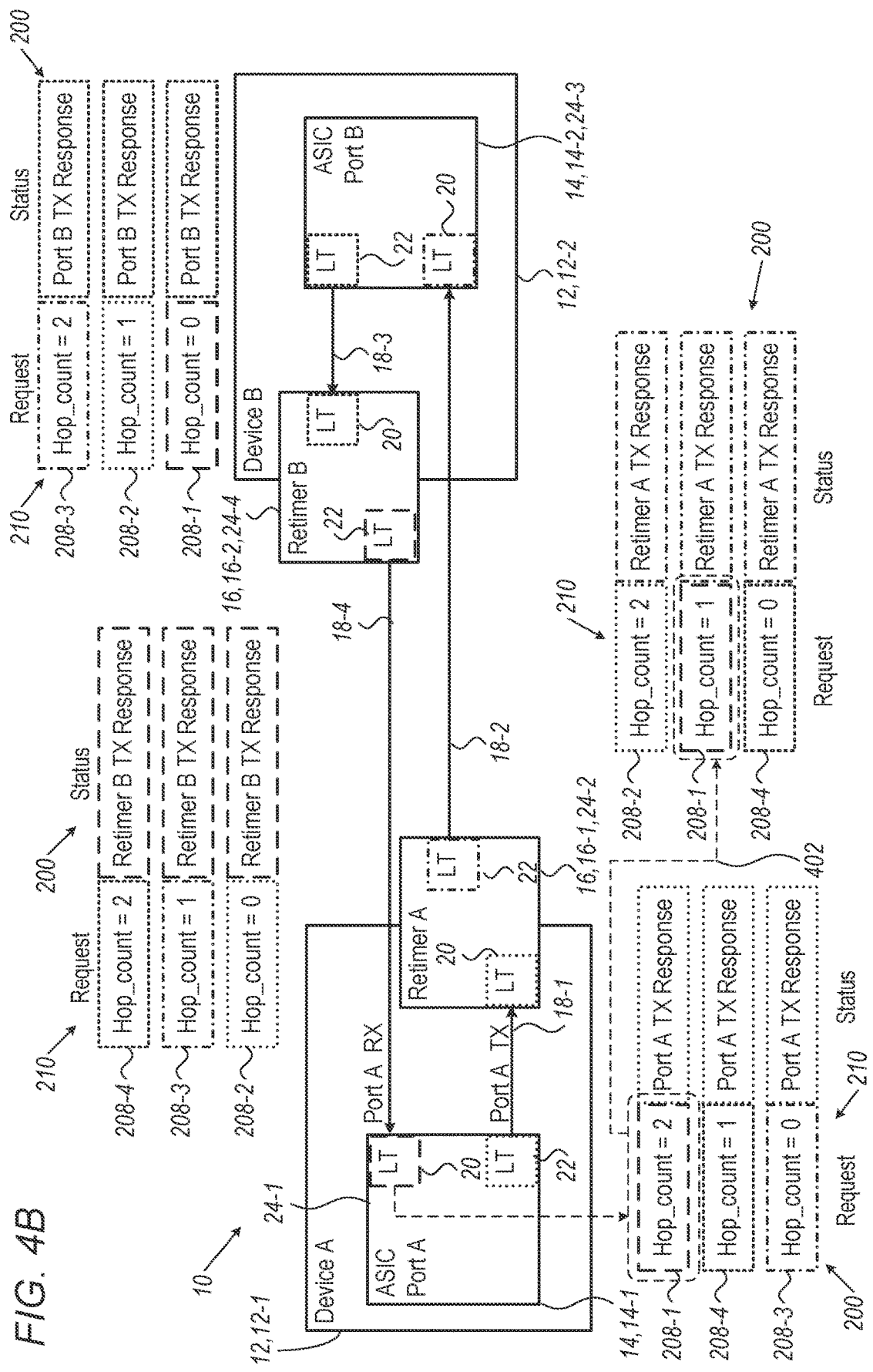

FIG. 4B shows Retimer A forwarding (line 402) the request 208-1 to Port B's (node 24-3) RX 20, after decreasing the hop_count to 1. FIG. 4B shows Port B's RX 20 receiving the request 208-1 with hop_count=1. Therefore, the destination of the received request 208-1 is not node 24-3.

Figure 4C:
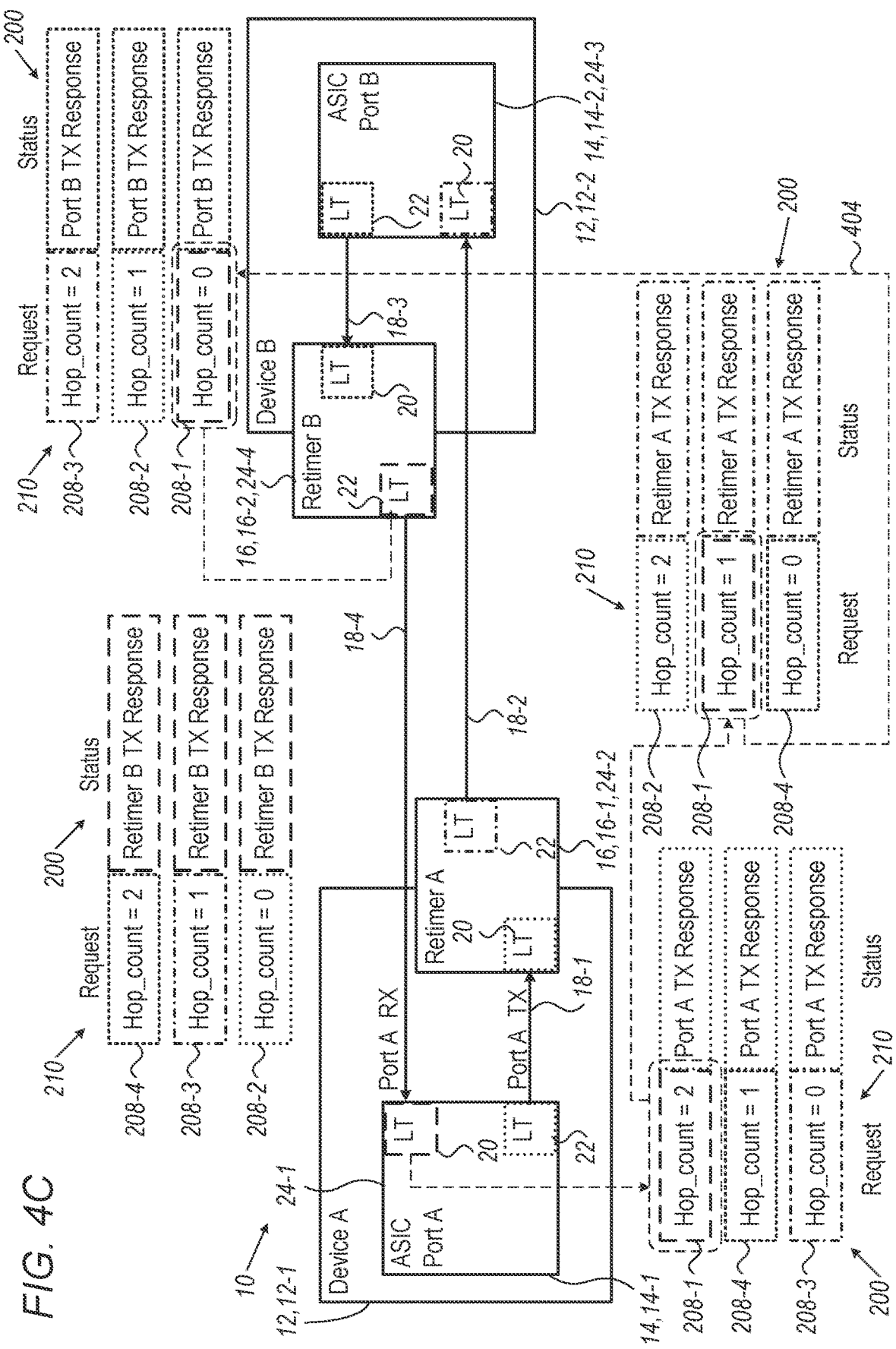

FIG. 4C shows Port B forwarding (line 404) the request 208-1 to Retimer B's (node 24-4) RX 20, after decreasing the hop_count to 0.

Figure 4D:
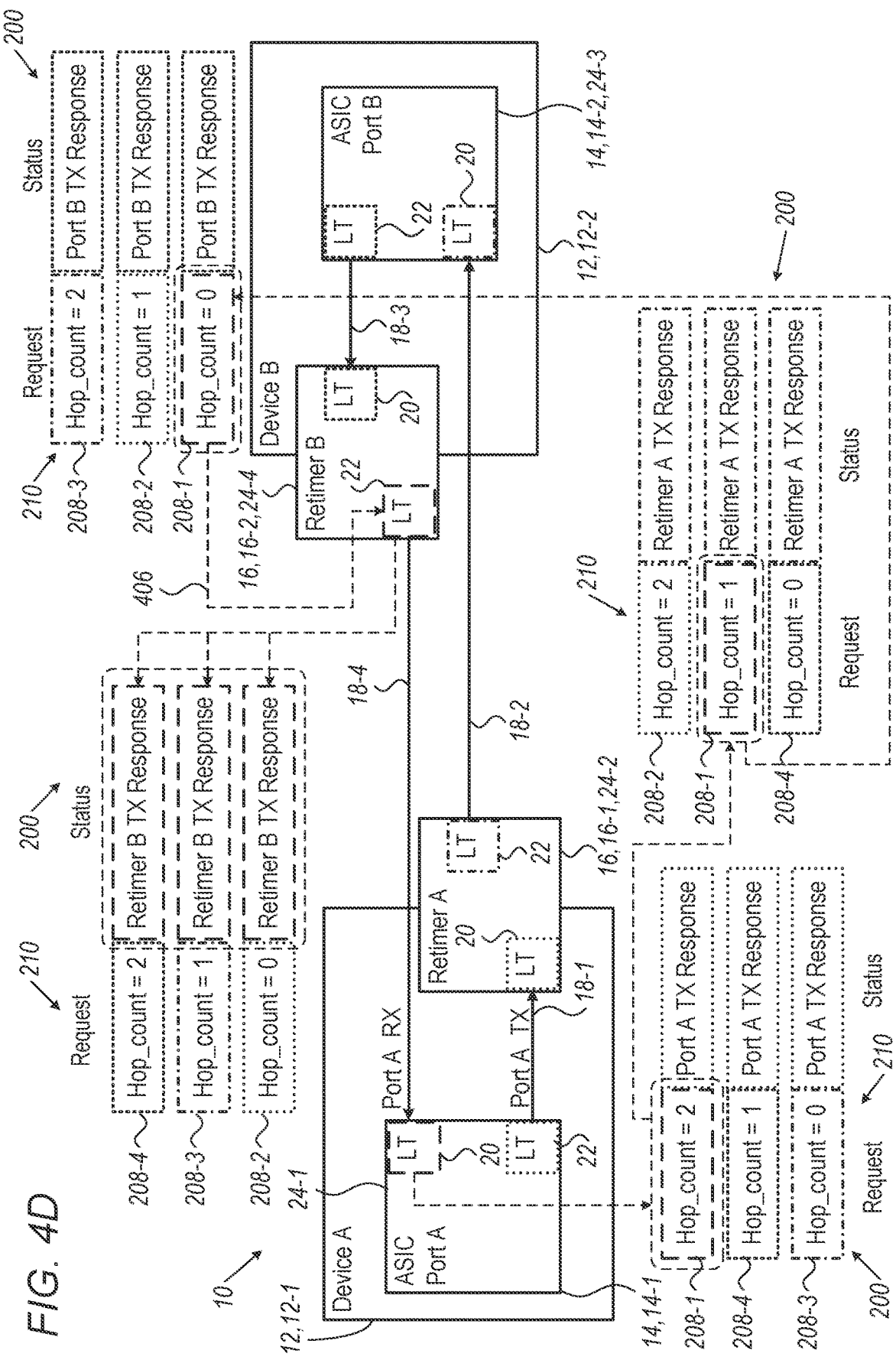

FIG. 4D shows Retimer B's RX 20 receiving the request 208-1 with hop_count=0. Therefore, the destination of request 208-1 is node 24-4 and in particular the TX 22 of node 24-4. Retimer B updates (line 406) its TX 22 based on the received request 208-1 and updates the status field of the LT frame 200 which indicates to Port A's (node 24-1) RX 20 the status of the request 208-1.

The Hop_count may be used in an incremental manner (e.g., count up to 3 or to any suitable number (positive or negative) or in a decremental way (e.g., count down to 0 or 1 or to any suitable number (positive or negative)).

Reference is now made to FIGS. 5A-D, which are block diagram views of the system 10 of FIG. 1A illustrating signaling completion of link training (LT).

The completion of link training of each of the LT engines or nodes 24, is performed after all LT machines over all links 18 complete their receiver 20 and transmitter 22 tuning. If one of the LT machines has completed its tuning, it still keeps LT activated by forwarding requests of other nodes 24, since the requests 208 of other nodes 24 are still used to complete the LT process for other links 18 in the system 10.

In some embodiments, the LT machines are synchronized regarding the completion of LT of each link 18 using a "ready allowed" status/concept, in which each receiver 20 sets a flag 500 that it has completed its tuning and "allows" LT to be completed. The "ready allowed" flag (or bit) 500 is included in the LT frame 200 and indicates the readiness of the local receiver 20 with respect to LT completeness. Once all LT machines (four in the case of the Half-Retimed example shown above) and described in more detail below with reference to FIGS. 5A-D, set their "ready allowed" bits indicating that their respective links 18 are tuned, the LT machines complete the LT and move to operational mode (in which the system 10 may operate to send data after LT is completed), which generally occurs on all link partners at the same time (within a few milliseconds difference, which is expected).

FIGS. 5A-D shows how the "ready-allowed" flag 500 propagates to each node 24, and shows the logic (box 502) of each LT on each node 24. FIGS. 5A-D demonstrate an example of a specific order of receiver 20 readiness as follows: Port A's (node 24-1) RX 20 shown in FIG. 5A, then Retimer A's (node 24-2) RX 20 shown in FIG. 5B, then Port B's (node 24-3) RX 20 shown in FIG. 5C, and then Retimer B's (node 24-4) RX 20 shown in FIG. 5D. This order is only an example, and any completion order may occur. In other words, each receiver is able to reach an independent decision to enable the "ready allowed" flag 500.

Figure 5A:
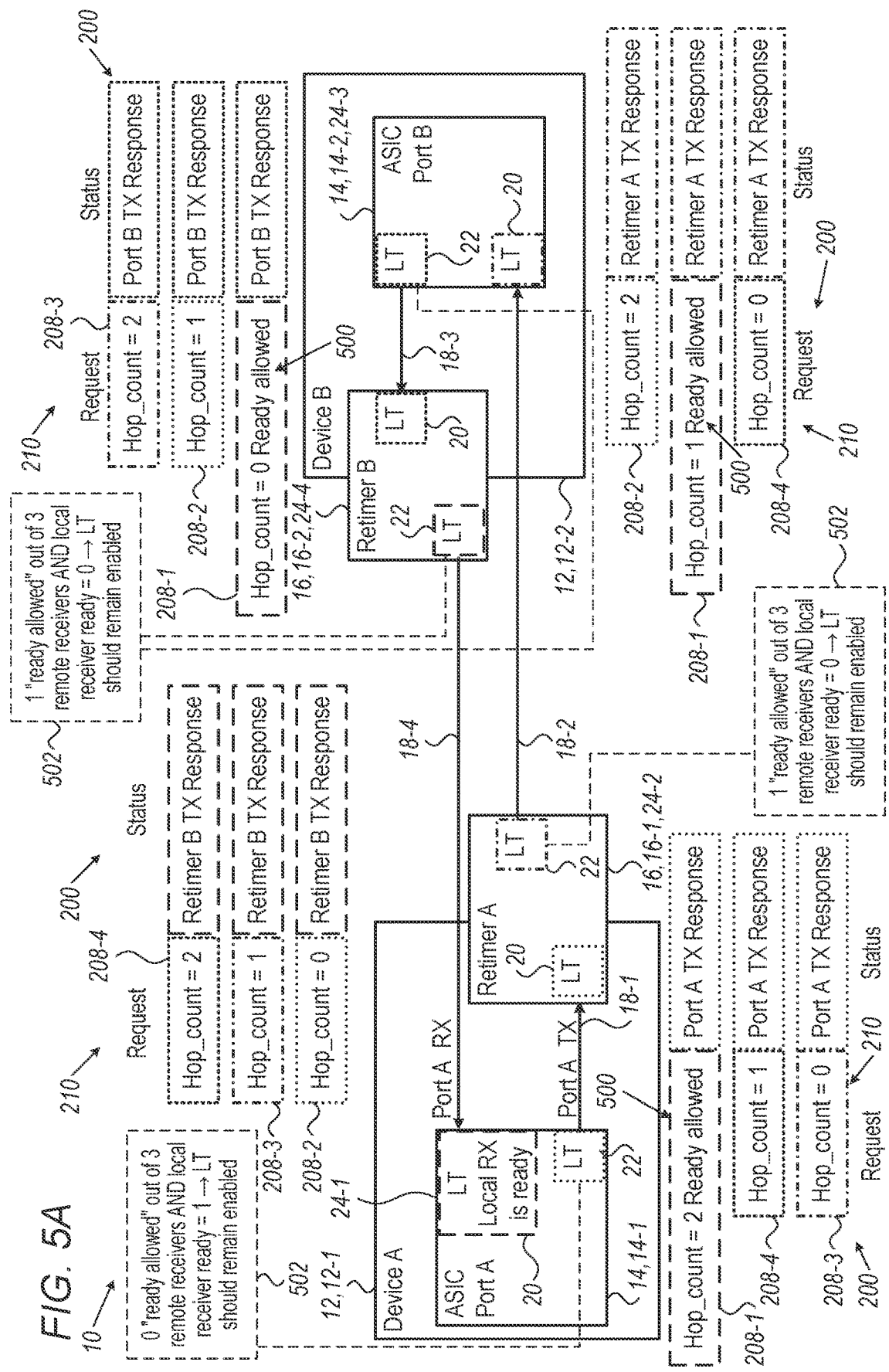
FIGS. 5A-D are block diagram views of the system of FIG. 1A illustrating signaling completion of link training.

FIG. 5A shows Port A's (node 24-1) RX 20 has completed its RX Equalization (EQ) process, and does not generate further requests to the remote TX 22 of node 24-4 and also does not receive further responses from the remote TX 22 of node 24-4. Port A's RX 20 generates the "ready allowed" flag 500 in its request 208-1. Each node 24 is aware that there is 1 RX out of 4 that has completed its RX EQ based on the flag 500 of request 208-1.

Figure 5B:
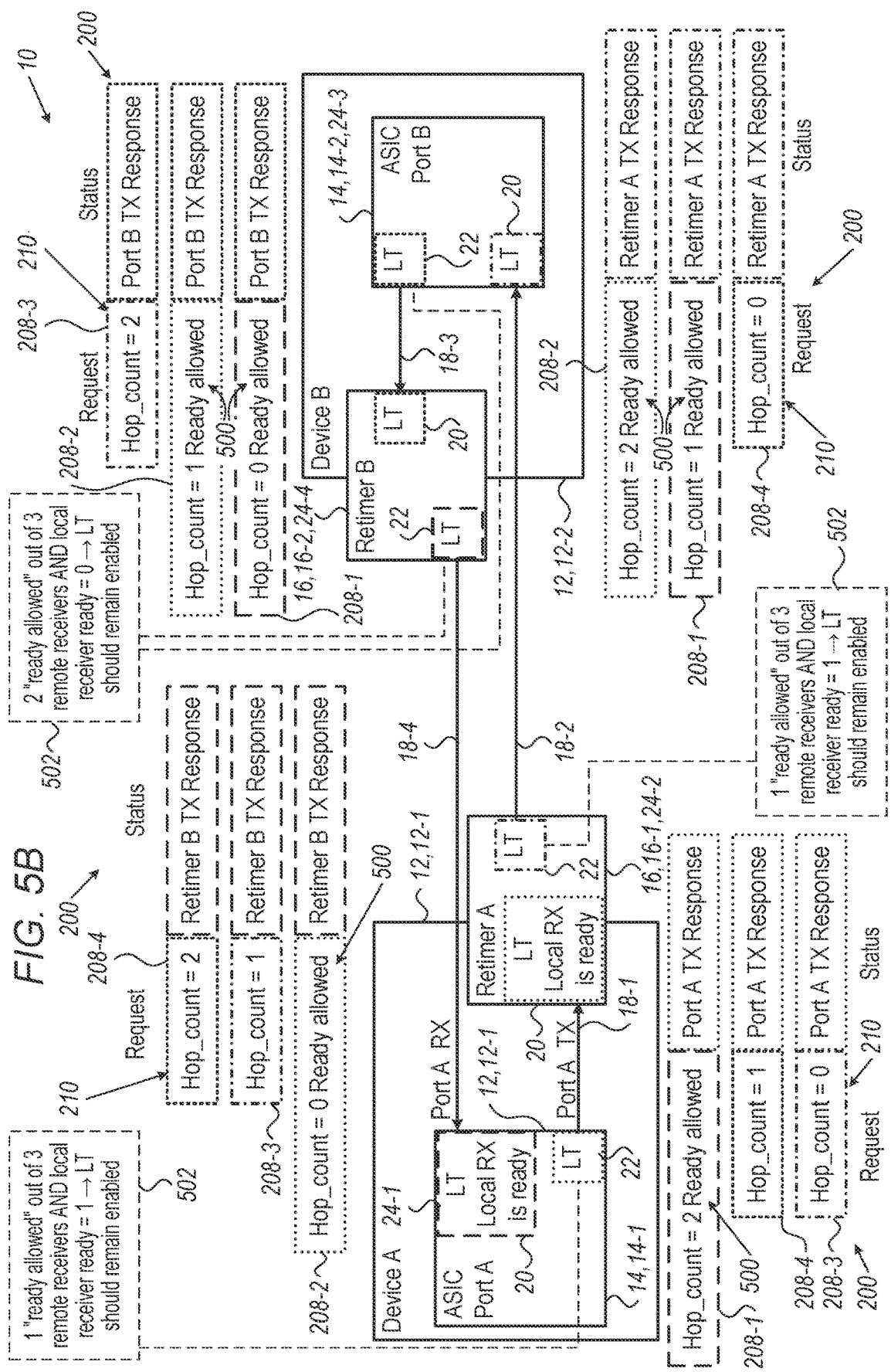

FIG. 5B shows that following Port A's RX EQ completion, Retimer A's (node 24-2) RX 20 completes its RX Equalization (EQ) process. RX 20 of Retimer A generates the "ready allowed" flag 500 in its request 208-2. Each node 24 is aware that there are 2 RXs out of 4 that have completed RX EQ.

Figure 5C:
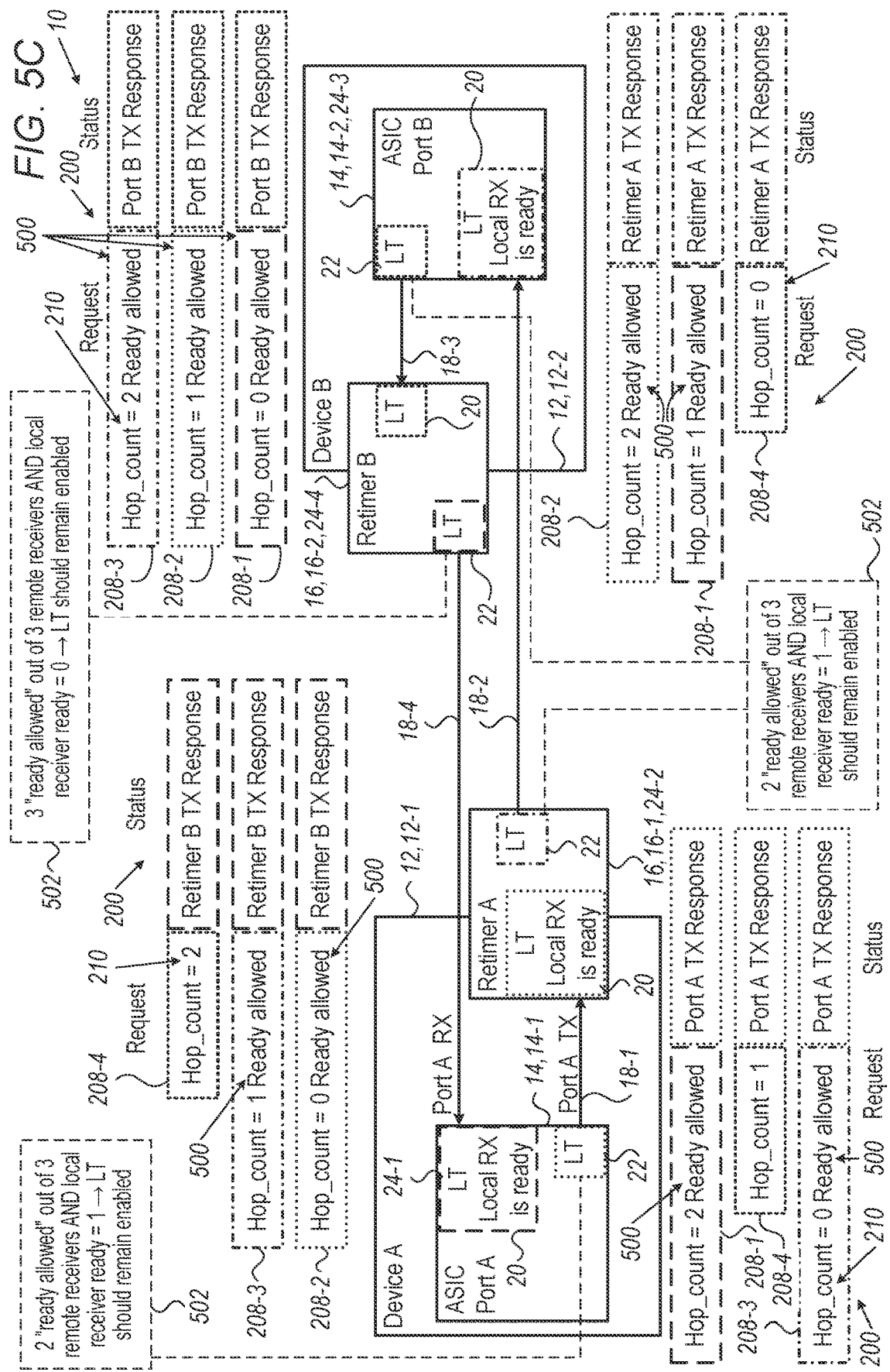

FIG. 5C shows following Retimer A's RX EQ completion, Port B's (node 24-3) RX 20 completes its RX Equalization (EQ) process. Port B's (node 24-3) RX 20 generates the "ready allowed" flag 500 on its request 208-3. Each node 24 is aware that there are 3 RXs out of 4 that have completed RX EQ.

Figure 5D:
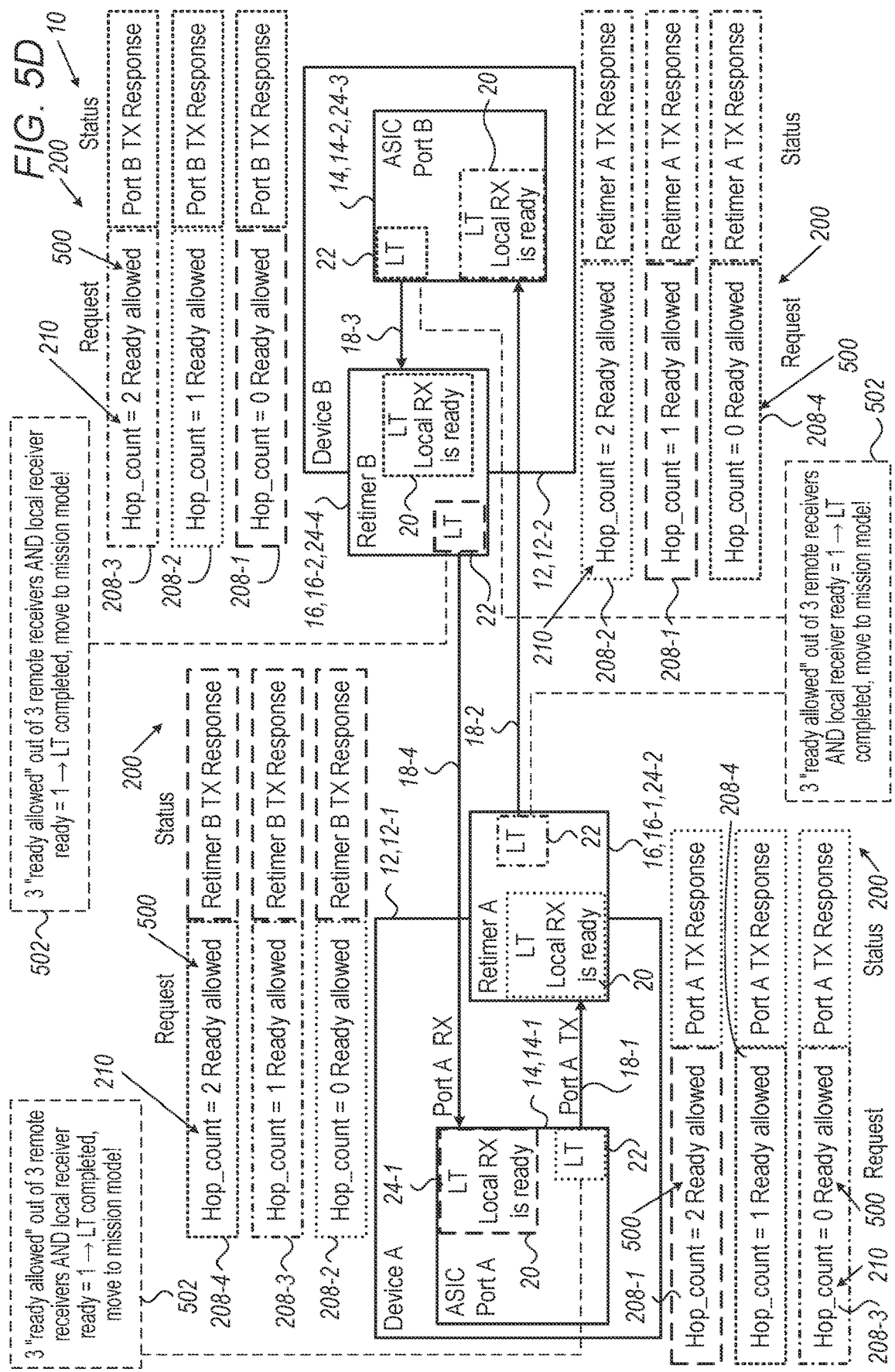

FIG. 5D shows following Port B's RX EQ completion, Retimer B's (node 24-4) RX 20 completes its RX Equalization (EQ) process. RX 20 of node 24-4 generates the "ready allowed" flag 500 on its request 208-4. Each node 24 is aware that there are 4 RXs out of 4 that have completed RX EQ and therefore LT can be completed in all the nodes 24.

Therefore, the nodes 24 are configured to indicate (for example, using the "ready allowed" flags 500) to other ones of the nodes 24 that link training of respective ones of the receiver-transmitter link partners has been completed over respective ones of the links 18. In other words, respective ones of the nodes 24 (e.g., nodes 24-1, 24-2, 24-3) are configured to indicate to node 24-4 using the multiple requests (e.g., requests 208-1, 208-2, 208-3) that link training of respective ones of the receiver-transmitter link partners (e.g., the receiver-transmitter link partners between nodes 24-4 and 24-1, between nodes 24-1 and 24-2, and between node 24-2 and 24-3, respectively) has been completed over respective ones of the links 18 (e.g., links 18-4, 18-1, 18-2, respectively).

The nodes 24 are configured to exit link training mode and enter operational mode responsively to all the receiver-transmitter link partners being indicated as having completed link training. By way of example, node 24-1 is configured to exit link training mode and enter operational mode responsively to all the receiver-transmitter link partners having completed link training as indicated in the multiple requests (e.g., requests 208-2, 208-3, 208-4) of the link training frame 200 received by node 24-1 and based on the receiver-transmitter link partners between nodes 24-4 and 24-1 having completed link training.

Figure 6:
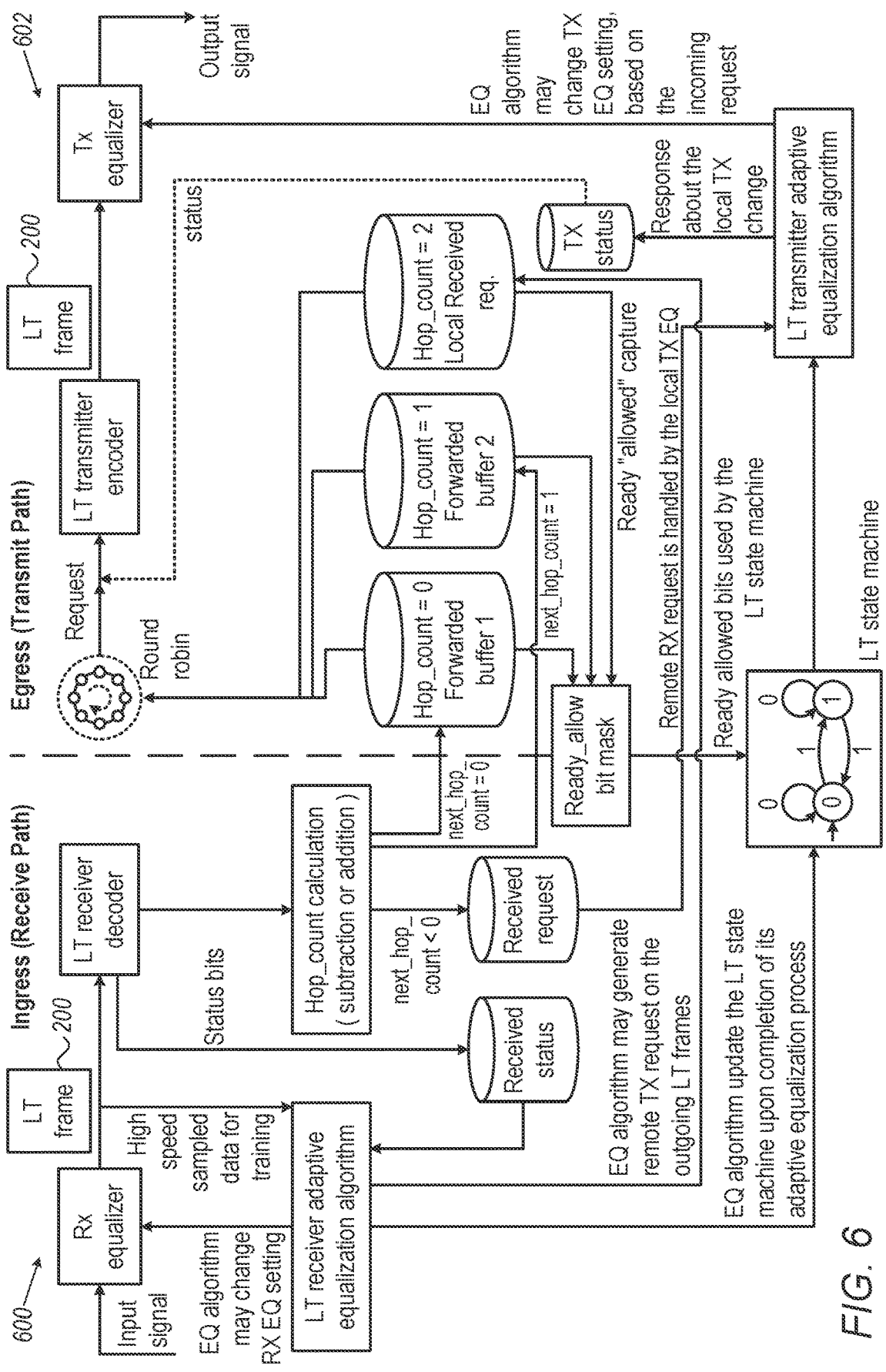
FIG. 6 is a block diagram showing ingress and egress processing in one of the nodes in the system of FIG. 1A.

Reference is now made to FIG. 6, which is a block diagram showing example ingress 600 and egress 602 processing in one of the nodes 24 in the system 10 of FIG. 1A. FIG. 6 shows a high-level functional description of the port and retimer multi-hop logic in each ASIC (Port and Retimer).

It should be noted that embodiments of the present invention are not limited with regard to implementing the 802.3 LT frame structure. The 802.3 LT frame structure has been described herein for the sake of simplicity. Any suitable request/response backchanneling method may be used. The above examples demonstrate specific use cases of half-retimed multi-segments.

Figure 7:
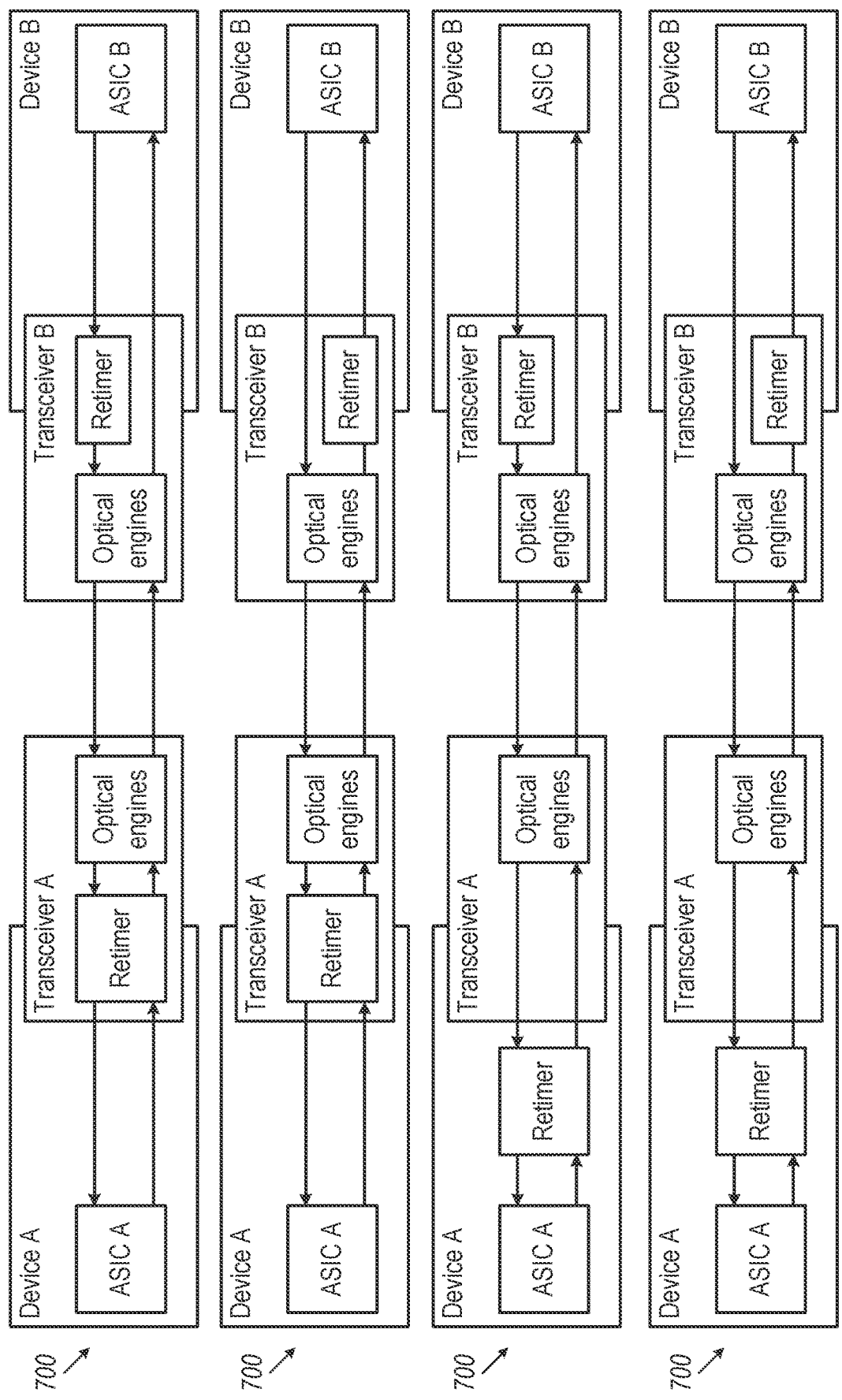
FIG. 7 are block diagram views of full retimed to half retimed multi-segment communication network systems.
Figure 8:
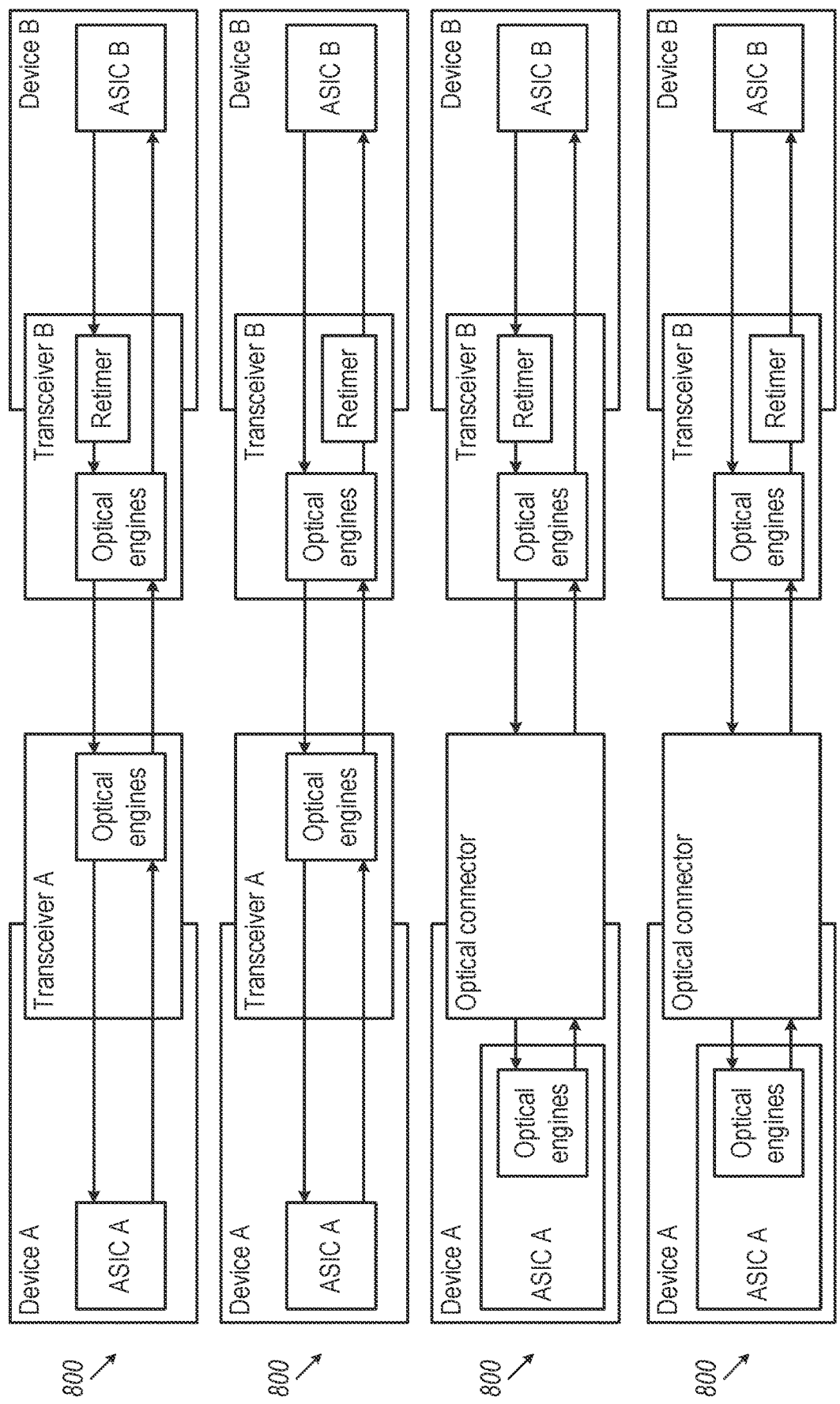
FIG. 8 are block diagram views of half-retimed to direct drive multi-segment communication network systems.
Figure 9:
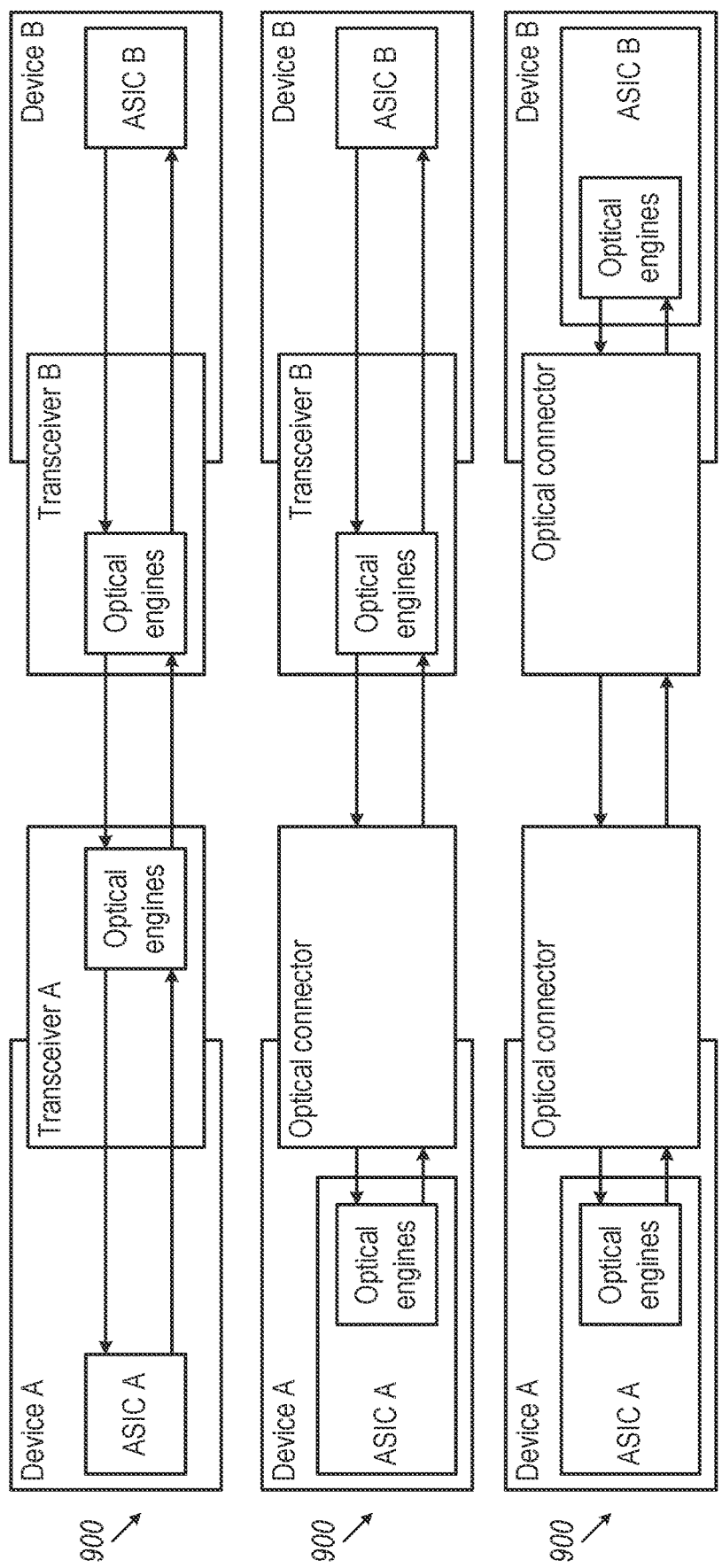
FIG. 9 are block diagram views of direct drive to direct drive multi-segment communication network systems.
Figure 10:
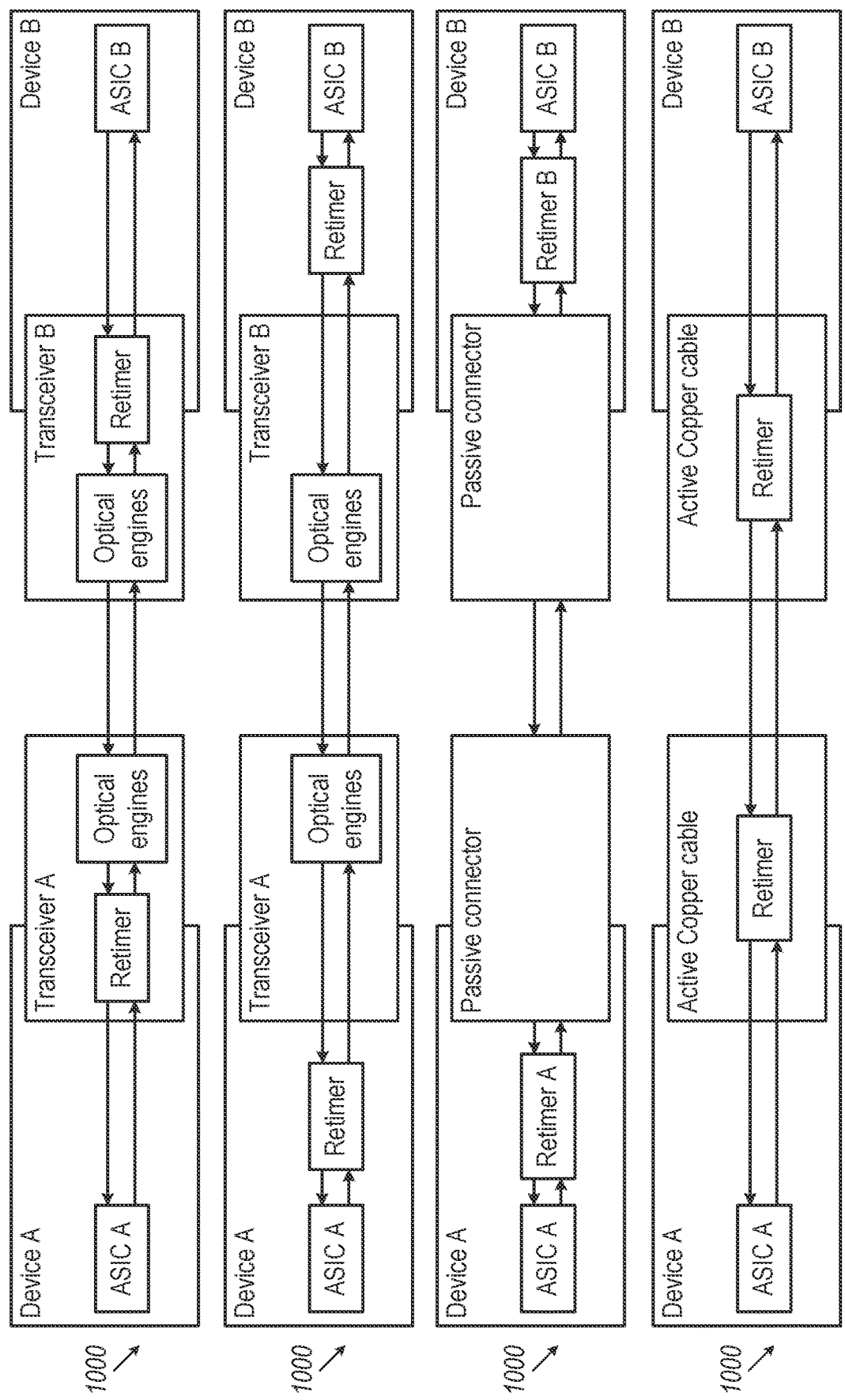
FIG. 10 are block diagram views of full retimed to full retimed multi-segment communication network systems.
Figure 11:
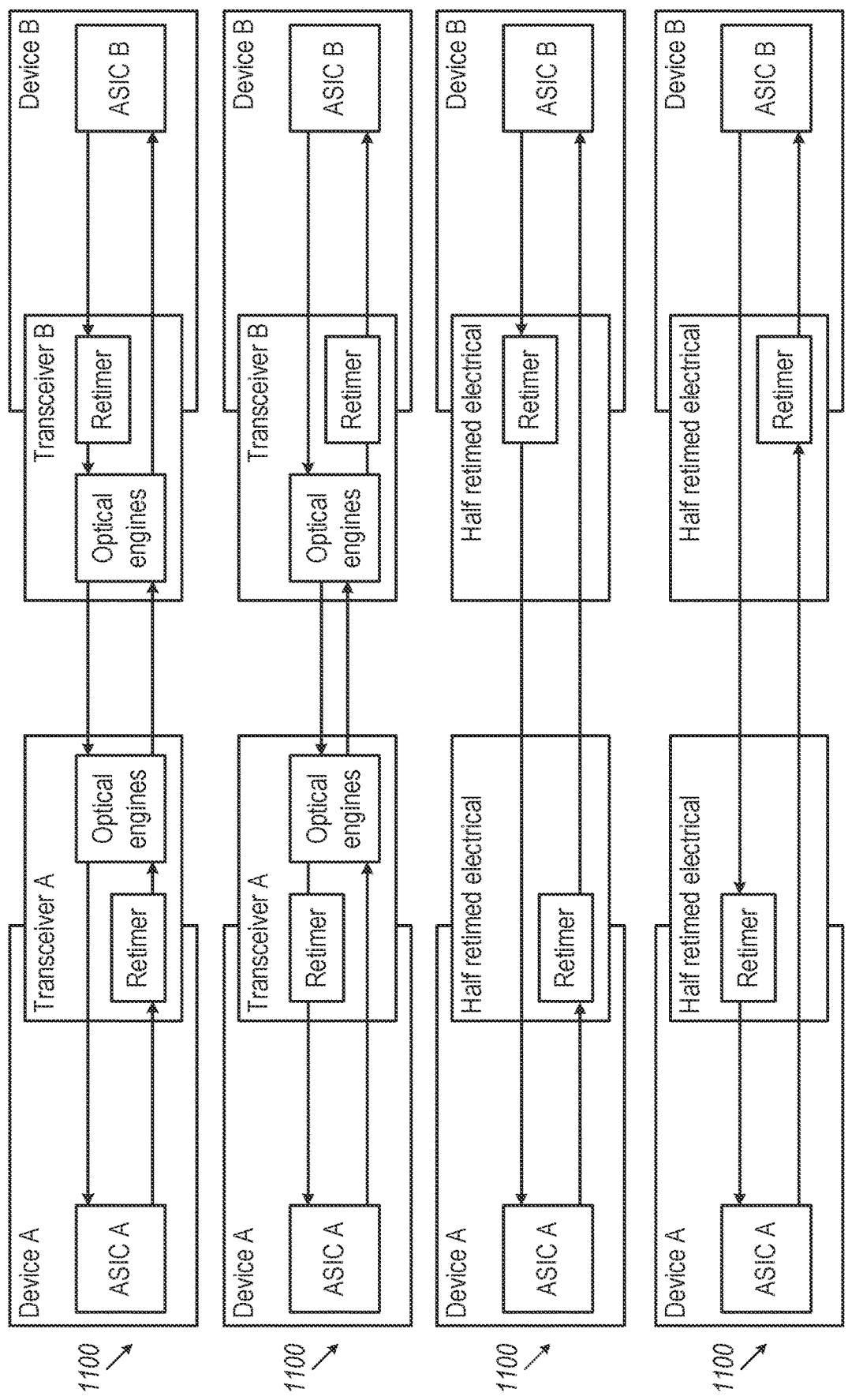
FIG. 11 are block diagram views of half retimed to half retimed multi-segment communication network systems.

Reference is now made to FIGS. 7-11. The link training system 10 and method described above with reference to FIGS. 1-6 may be implemented with any suitable multi-segment communication network system with suitable changes thereto. FIGS. 7-11 show various multi-segment communication network systems in which link training as described above with reference to FIGS. 1-6 may be implemented with suitable changes. FIG. 7 are block diagram views of full retimed to half retimed multi-segment communication network systems 700. FIG. 8 are block diagram views of half-retimed to direct drive multi-segment communication network systems 800. FIG. 9 are block diagram views of direct drive to direct drive multi-segment communication network systems 900. FIG. 10 are block diagram views of full retimed to full retimed multi-segment communication network systems 1000. FIG. 11 are block diagram views of half retimed to half retimed multi-segment communication network systems 1100.

In practice, some or all of the functions of each port and retimer may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A multi-segment communication network system, comprising multiple nodes connected via links, each node including a transmitter and receiver, the nodes including: a first node, which includes a first receiver and a first transmitter; and a second node, which includes a second receiver and a second transmitter, wherein as part of an iterative link training process:
   the first transmitter is to transmit a link training frame comprising a training pattern to the second receiver;
   the second receiver is to receive the link training frame from the first transmitter;
   the second node is to: find a tuning factor to which to tune the first transmitter responsively to the training pattern, wherein the tuning factor comprises transmission parameter settings for tuning the first transmitter; and generate a request indicative of the found tuning factor;
   the second transmitter is to send the request in the link training frame to the first receiver via a plurality of the links connecting the multiple nodes and via a plurality of the multiple nodes;
   the first receiver is to receive the request; and
   the first node is to tune at least one parameter of the first transmitter based on the tuning factor indicated in the request.

2. The system according to claim 1, wherein the second receiver is a link partner of the first transmitter.

3. The system according to claim 1, wherein the first node is to recognize that the request is designated to be fulfilled by the first node.

4. The system according to claim 3, wherein the first node is to tune the at least one parameter of the first transmitter based on the tuning factor indicated in the request responsively to the request being recognized as designated to be fulfilled by the first node.

5. The system according to claim 3, wherein the request has an associated destination indicator, the first node being to recognize that the request is designated to be fulfilled by the first node responsively to the destination indicator associated with the request.

6. The system according to claim 5, wherein the destination indicator includes a hop indicator indicating a number of the links from the second node to the first node.

7. The system according to claim 6, wherein:
   each of the nodes disposed between the links extending from the second transmitter to the first transmitter is to adjust the hop indicator; and
   when the request arrives at the first node, the first node is to recognize that the request is designated to be fulfilled by the first node from a value of the hop indicator.

8. The system according to claim 3, wherein the link training frame comprises multiple requests having corresponding destination indicators.

9. The system according to claim 8, wherein the destination indicators include respective hop indicators indicating a number of the links over which the corresponding requests should traverse prior to being processed by respective ones of the nodes.

10. The system according to claim 9, wherein the second node is to adjust at least one of the hop indicators.

11. The system according to claim 8, wherein the second node is to tune at least one parameter of the second transmitter responsively to a given tuning factor in a given request of the multiple requests in the link training frame.

12. The system according to claim 11, wherein the second node is to recognize that the given request is designated to be fulfilled by the second node from a corresponding one of the destination indicators.

13. The system according to claim 1, wherein the second transmitter is to send the request with another training pattern in the link training frame via a link to a third receiver of a third one of the nodes.

14. The system according to claim 1, wherein:
the links define receiver-transmitter link partners;
the nodes are to indicate to other ones of the nodes that link training of respective ones of the receiver-transmitter link partners has been completed over respective ones of the links; and
the nodes are to exit link training mode and enter operational mode responsively to all the receiver-transmitter link partners being indicated as having completed link training.

15. The system according to claim 1, wherein:
the link training frame comprises multiple requests;
the links define receiver-transmitter link partners;
respective ones of the nodes are to indicate to the second node using the multiple requests that link training of respective ones of the receiver-transmitter link partners has been completed over respective ones of the links; and
the second node is to exit link training mode and enter operational mode responsively to all the receiver-transmitter link partners having completed link training as partially indicated in the multiple requests of the link training frame.

16. A multi-segment communication network method, comprising:
performing an iterative link training process in a system comprising multiple nodes connected via links, each node including a transmitter and receiver, the nodes including: a first node, which includes a first receiver and a first transmitter; and a second node, which includes a second receiver and a second transmitter
transmitting by the first transmitter of the first node a link training frame comprising a training pattern to the second receiver of the second node;
receiving by the second receiver the link training frame from the first transmitter;
finding by the second node a tuning factor to which to tune the first transmitter responsively to the training pattern, wherein the tuning factor comprises transmission parameter settings for tuning the first parameter;
generating by the second node a request indicative of the found tuning factor;
sending by the second transmitter of the second node the request in the link training frame via a plurality of links connecting the multiple nodes and via a plurality of the multiple nodes to the first receiver of the first node;
receiving the request by the first receiver; and
tuning by the first node at least one parameter of the first transmitter based on the tuning factor indicated in the request.

17. The method according to claim 16, wherein the second receiver is a link partner of the first transmitter.

18. The method according to claim 16, further comprising recognizing by the first node that the request is designated to be fulfilled by the first node.

19. The method according to claim 18, wherein the tuning comprises tuning the at least one parameter of the first transmitter based on the tuning factor indicated in the request responsively to the request being recognized as designated to be fulfilled by the first node.

20. The method according to claim 18, wherein the request has an associated destination indicator, the recognizing including recognizing that the request is designated to be fulfilled by the first node responsively to the destination indicator associated with the request.

21. The method according to claim 20, wherein the destination indicator includes a hop indicator indicating a number of links from the second node to the first node.

22. The method according to claim 21, further comprising each of the nodes disposed between the links extending from the second transmitter to the first transmitter adjusting the hop indicator, and wherein the recognizing includes, when the request arrives at the first node, recognizing that the request is designated to be fulfilled by the first node from a value of the hop indicator.

23. The method according to claim 18, wherein the link training frame comprises multiple requests having corresponding destination indicators.

24. The method according to claim 23, wherein the destination indicators include respective hop indicators indicating a number of the links over which the corresponding requests should traverse prior to being processed by respective ones of the nodes.

25. The method according to claim 24, further comprising the second node adjusting at least one of the hop indicators.

26. The method according to claim 23, further comprising the second node tuning at least one parameter of the second transmitter responsively to a given tuning factor in a given request of the multiple requests in the link training frame.

27. The method according to claim 26, further comprising the second node recognizing that the given request is designated to be fulfilled by the second node from a corresponding one of the destination indicators.

28. The method according to claim 16, wherein the sending includes the second transmitter sending the request with another training pattern in the link training frame via a link to a third receiver of a third node.

29. The method according to claim 16, wherein multiple nodes connected via links include the first and second node, the links defining receiver-transmitter link partners, the method further comprising:
given nodes of multiple nodes indicating to other ones of the multiple nodes that link training of respective ones of the receiver-transmitter link partners has been completed over respective ones of the links; and
the nodes exiting link training mode and entering operational mode responsively to all the receiver-transmitter link partners being indicated as having completed link training.

30. The method according to claim 16, wherein the link training frame comprises multiple requests, multiple nodes being connected via links including the first and second node, the links defining receiver-transmitter link partners, the method further comprising:

respective ones of the nodes indicating to the second node using the multiple requests that link training of respective ones of the receiver-transmitter link partners has been completed over respective ones of the links; and the second node exiting link training mode and entering operational mode responsively to all the receiver-transmitter link partners having completed link training as partially indicated in the multiple requests of the link training frame.

* * * * *